US012775730B2

(12) United States Patent
Balin et al.

(10) Patent No.: US 12,775,730 B2
(45) Date of Patent: Oct. 27, 2026

(54) SECURING SENSITIVE DATA IN HELM CHARTS

(71) Applicant: Dell Products L.P., Round Rock, TX (US)

(72) Inventors: Maxim Balin, Gan-Yavne (IL); Shree Rathinasamy, Round Rock, TX (US); Eliyahu Rosenes, Bet Shemesh (IL)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 18/802,074

(22) Filed: Aug. 13, 2024

(65) Prior Publication Data

US 2026/0050679 A1 Feb. 19, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

2021/0397712 A1* 12/2021 Gajananan ............. G06F 21/51
2023/0328047 A1* 10/2023 McNamara, Jr. ... H04L 63/0407
2024/0430155 A1* 12/2024 Goswami ............ H04L 41/0803
2025/0094560 A1* 3/2025 Ghergu ................... G06F 21/46
2025/0211590 A1* 6/2025 Jovic ................... H04L 63/0876
2025/0214605 A1* 7/2025 Langefeld ............... H04L 67/12

OTHER PUBLICATIONS

Harish Govinda Gowda; Secure and Automated Kubernetes Deployments with Helm, Vault, and GitOps; International Journal of Scientific Research & Engineering Trends; vol. 9, Issue 6, Nov.-Dec. 2023, pp. 1-7.*

* cited by examiner

*Primary Examiner* — Mohammad A Siddiqi
(74) *Attorney, Agent, or Firm* — WOMBLE BOND DICKINSON (US) LLP

(57) ABSTRACT

Methods and systems for managing operation of a deployment are disclosed. The operation may be managed by reducing a likelihood of sensitive data in a helm chart from being compromised. The likelihood may be reduced by extracting the sensitive data from the helm chart and storing the sensitive data in a secure vault. A helm chart prototype may be generated after extraction of the sensitive data from a helm chart. To perform computer implemented services, upon receiving a request, the sensitive data from the secure vault may be added to the helm chart prototype to generate a complete helm chart. Configuration settings and the sensitive data in the complete helm chart may be used to perform computer implemented services.

20 Claims, 7 Drawing Sheets

```
# chart.yaml
name: { name.value }
version: { version.value }
Kubernetes version: { kubeVersion.value }
description: { description.value }
home: {url.value}
dependencies: # A list of the chart requirements (optional)
        -name: { depName.value }
         version: { depVersion.value }
         repository: { depRepository.value }
maintainers: # (optional)
        -name: { maintainerName.value }
         email: { maintainerEmail.value }
```

```
# Values.yaml
title: "My Database" # Sent to the site template

{depName1.value}: # Example: MySQL
        max_connections: {connectionsInt.value} # Sent to MySQL
        password: { password.value }

{depName2.value} # Example: unnamed API
        password: {password.value}
```

FIG. 2C

SECURING SENSITIVE DATA IN HELM CHARTS

FIELD

Embodiments disclosed herein relate generally to managing operation of a deployment. More particularly, embodiments disclosed herein relate to reducing a likelihood of sensitive data in a helm chart being compromised.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2C shows a diagram illustrating content of a data structure in accordance with an embodiment.

DETAILED DESCRIPTION

Figure 1:
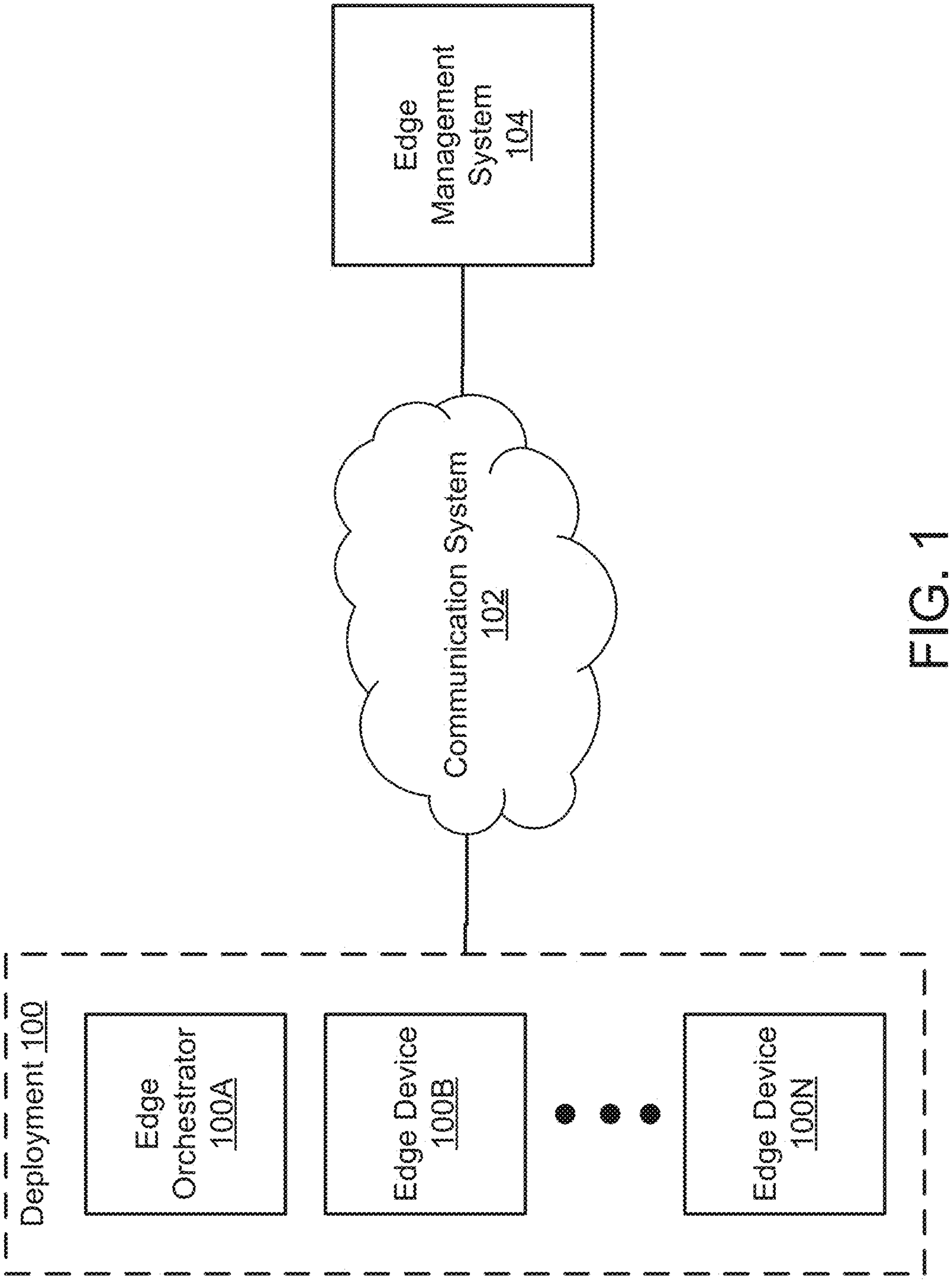
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a deployment. The deployment may be managed by reducing a likelihood of sensitive data in a helm chart from being compromised.

The likelihood of the sensitive data being compromised may be reduced by (i) obtaining the sensitive data from the helm charts and (ii) securing the sensitive data.

The sensitive data may be obtained by extracting the sensitive data from a helm chart. The sensitive data in a helm chart of the helm charts may be replaced with placeholders. A placeholder of the placeholders may include a secret identification string and/or code that links to the sensitive data. By replacing the sensitive data with the placeholders, a helm chart prototype may be generated from the helm chart. The helm chart prototype may be stored in a helm chart prototype repository for use in a deployment when a request for computer implemented services is made. The sensitive data may also be stored in a secure vault. The secure vault may be located on an edge device in the deployment and require authorization by an administrator to read the sensitive data.

When a request is made for the computer implemented services, a helm chart prototype may be selected from the helm chart prototype repository. Sensitive data may also be read from the secure vault. The sensitive data may be added to the helm chart prototype by replacing placeholders in the helm chart prototype with the sensitive data. The sensitive data may be added by using the secret identification string and/or code to point to the sensitive data in the secure vault. By replacing the placeholders with the sensitive data, a complete helm chart may be generated. Configuration settings from the complete helm chart may be used to (i) build software, (ii) add the software to a container to make a container image, and (iii) assign the container image to an edge device to perform computer implemented services.

In an embodiment, a method for managing operation of a deployment is disclosed. The method may include (i) obtaining, from a requestor, a request for the deployment to provide a desired service; (ii) obtaining, based on the request, a desired state chart prototype that comprises instructions and lacks sensitive data for the operation of the deployment to provide the desired service; (iii) obtaining the sensitive data for the operation of the deployment; (iv) obtaining a completed desired state chart by combining the desired state chart prototype with the sensitive data; (v) obtaining at least one process from an automation framework using the completed desired state chart; and (vi) providing the desired service using the at least one process.

The method may include, before obtaining the request: (i) obtaining the completed desired state chart; (ii) obtaining, from the completed desired state chart, second sensitive data and the desired state chart prototype; (iii) performing a review, by an administrator, of the second sensitive data and the desired state chart prototype to validate authenticity, confidentiality, and syntax of the second sensitive data and to ensure that the desired state chart prototype lacks the second sensitive data; (iv) obtaining, from the review, authorization from the administrator to store the second sensitive data in a secure vault; and (v) storing the second sensitive data in the secure vault.

Obtaining, from the completed desired state chart, the second sensitive data and the desired state chart prototype may include performing a validation process on data within the completed desired state chart to identify the second sensitive data and ensure that the second sensitive data meets a set of standards.

Performing the validation process may include (i) identifying the second sensitive data in the completed desired state chart by performing a keyword search in each section of the completed desired state chart; and (ii) ensuring the second sensitive data meets the set of the standards, the set of the standards comprising correct character formatting, a readable format, compliance with data privacy regulations, and being in an original state in which the second sensitive data has not been altered by unauthorized users.

Obtaining the sensitive data may include reading the sensitive data from a secure vault.

The secure vault may store the sensitive data, is located on a device of the deployment, and requires authorization from an administrator to access the sensitive data.

The sensitive data may include credentials and confidential information.

Obtaining the completed desired state chart by combining the desired state chart prototype with the sensitive data may include replacing a field in the desired state chart prototype with a corresponding portion of the sensitive data.

The completed desired state chart is a set of instructions for configuring and customizing an application to accomplish a task or perform a service.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the data processing systems may need to be configured in particular manners. For example, applications hosted by the data processing systems may need to interact with other applications using credentials and/or types of information.

However, the information used to configure the data processing may allow for the data processing systems to be exploited. If obtained by a malicious actor, a malicious actor may use the information to compromise data, gain control over data processing systems, and/or to perform other undesired activities.

In general, embodiments disclosed here relate to systems and methods for managing operation of a deployment. The operation may be managed by securing sensitive data that is used in a helm chart. A helm chart may be a set of instructions that includes a list of configurations settings. The configuration settings may define, customize, and manage artifacts. The artifacts may include executable code, libraries, and/or container applications. The artifacts may follow the instructions to perform computer implemented services within a deployment.

The helm chart may include sensitive data within a portion of the configuration settings. The sensitive data may include passwords, ports, internet protocol (IP) addresses, credentials of administrators, uniform resource locator (URL) addresses of repositories with proprietary software, etc. The sensitive data may be necessary for an artifact of the artifacts to utilize to perform services. For example, a portion of the instructions for an artifact may include accessing a repository of proprietary software for data and, to access the repository, the URL address and a password may be needed.

However, the sensitive data in the helm chart may be vulnerable to access by an unauthorized user. To reduce a risk of vulnerability, the sensitive data may be parsed from the helm chart and stored in a secure vault. The secure vault may be located in a device in the deployment and may require access by an administrator. As a result of parsing the sensitive data from the helm chart, a helm chart prototype may be created.

The helm chart prototype, unlike a helm chart, may lack the sensitive data and instead include placeholders for the sensitive data. The sensitive data may be obtained from the secure vault using the secret identification string and/or code in a placeholder of the placeholders and added to the helm chart prototype. Addition of the sensitive data to a portion of the placeholders in the helm chart prototype may form a complete helm chart. The addition of the sensitive data may be performed when a request is made for computer implemented services by the deployment. Once the computer implemented services are performed, the complete helm chart may be discarded to ensure that the sensitive data remains only in the secure vault.

By parsing the sensitive data from the helm chart and storing the sensitive data in a secure vault, the sensitive data may be secured from access by an unauthorized user. By adding sensitive data to the helm chart prototype to make the complete helm chart when the request is made, the computer implemented services may performed. Once the computer implemented services are performed, the complete helm chart may be discarded to further secure the sensitive data.

To provide the above noted functionality, the system may include deployment 100 and edge management system 104. Each of these components is discussed below.

Edge management system 104 may secure sensitive data in a helm chart. To secure the sensitive data, edge management system 104 may receive the helm chart. With the helm chart, edge management system 104 may perform a search through each line of the helm chart. Edge management system 104 may recognize the sensitive data through a keyword search. When a keyword is found that may be categorized as sensitive data, edge management system 104 may obtain a value for the keyword and record the keyword with the value as new sensitive data. Once the search for the new sensitive data has been completed, edge management system 104 may insert placeholders where the sensitive data had existed in the helm chart. A placeholder of the placeholders may include a secret identification string and/or code that points to the sensitive data. Insertion of placeholders in the helm chart may form a helm chart prototype. The helm chart prototype and the new sensitive data may be passed to deployment 100.

Deployment 100 may include edge orchestrator 100A and edge device 100B-100N. Edge orchestrator 100A may manage deployment 100. To manage deployment 100, edge orchestrator 100A may receive the helm chart prototype and the new sensitive data from edge management system 104. The new sensitive data may be added to a secure vault in any number of edge device 100B-100N. Also, the helm chart prototype may be added to a repository of helm chart prototypes.

When a request for computer implemented services is received by deployment 100, edge orchestrator 100A may retrieve a helm chart prototype. The helm chart prototype may be selected that can perform the computer implemented services for the request. Edge orchestrator 100A may also retrieve sensitive data from the secure vault from any number of edge device 100B-100N. Edge orchestrator 100A may retrieve the sensitive data by using the secret identification string and/or code in a placeholder to obtain the sensitive data. The sensitive data may be added to placeholders in the helm chart prototype to form a complete helm chart. Edge orchestrator 100A may also assign artifacts, which may include containers. The containers may be assigned to any number of edge device 100B-100N to perform the computer implemented services. The containers may utilize configuration settings in the complete helm chart to perform the computer implemented services. Once the computer implemented services are performed, edge orchestrator 100A may discard the complete helm chart.

While providing their functionality, any of deployment 100 and edge management system 104 may perform all, or a portion, of the flows and methods shown in FIGS. 2A-3B.

Any of (and/or components thereof) deployment 100 and edge management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
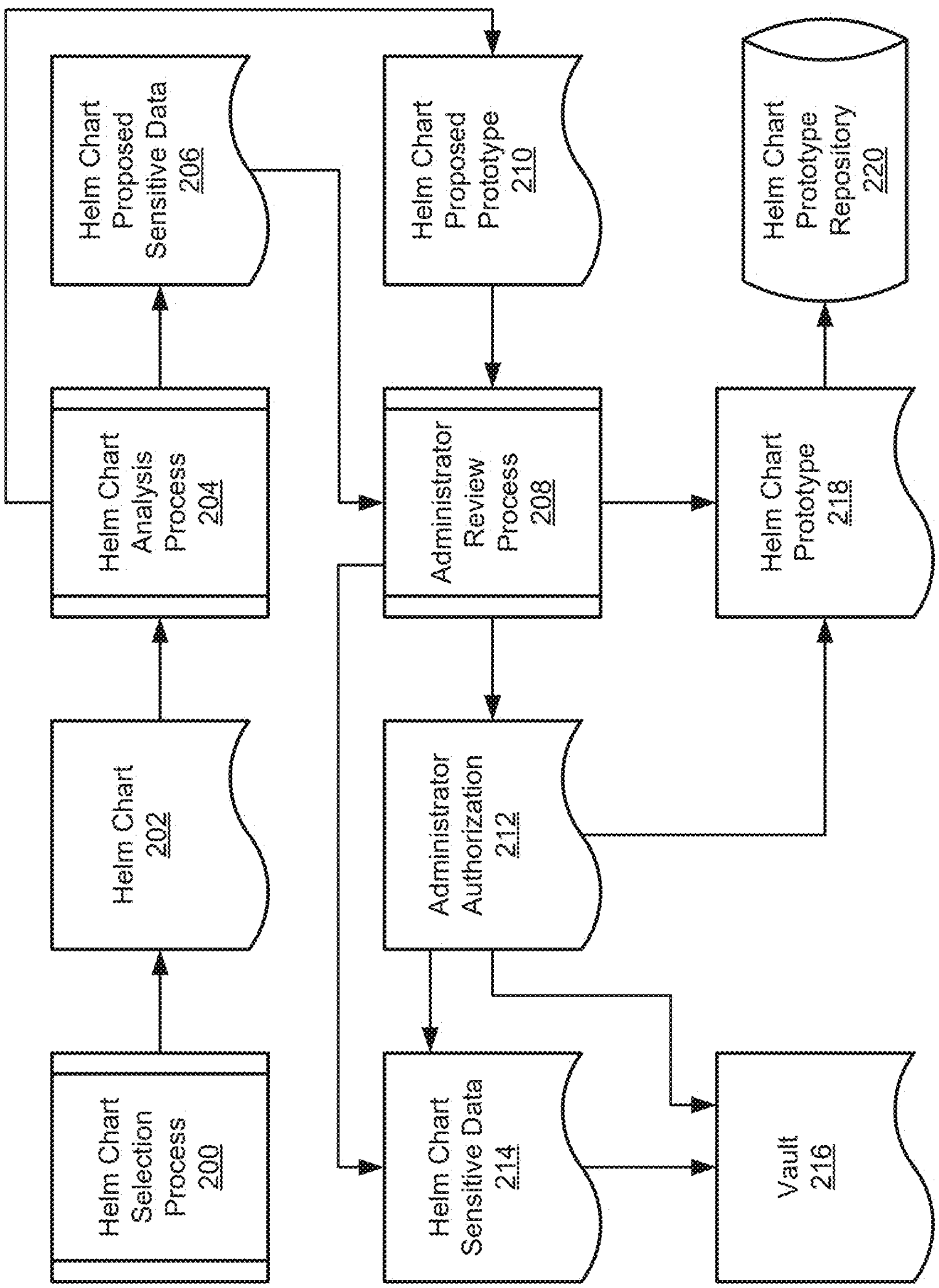
FIGS. 2A-2B show data flow diagrams illustrating operation of a system in accordance with an embodiment.
Figure 2B:
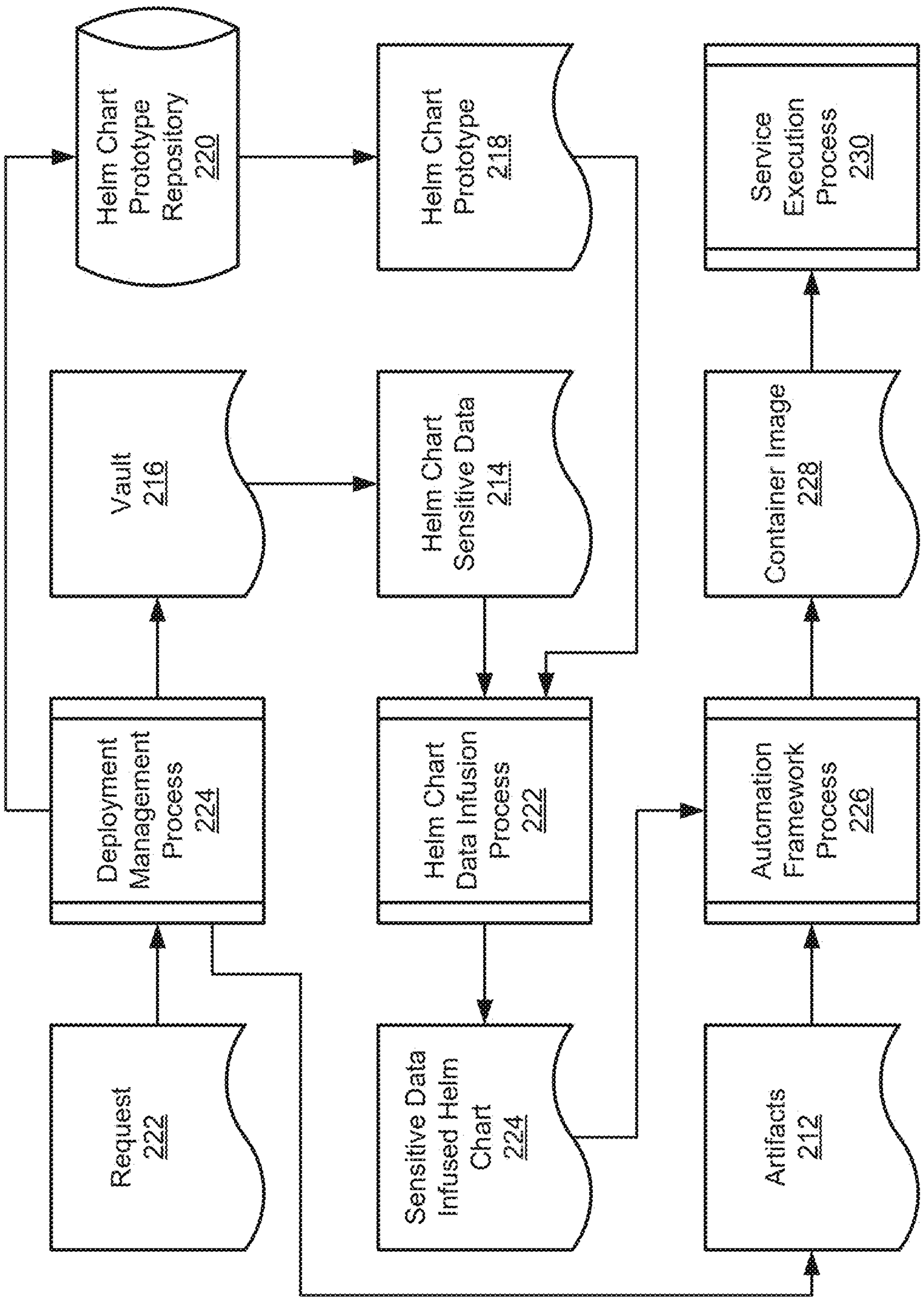

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 202, 206, etc.) is used to represent data structures, a second set of shapes (e.g., 200, 204, etc.) is used to represent processes performed using and/or that generate data, and a third set of shapes (e.g., 210, etc.) is used to represent large scale data structures such as databases.

Turning to FIG. 2A, a first data flow diagram in accordance with an embodiment is shown. The first data flow diagram may illustrate data used in and data processing performed in storing sensitive data in a secure vault and generating a helm chart prototype.

To store the sensitive data in a secure vault and generate the helm chart protype, helm chart selection process 200 may be performed. During helm chart selection process 200, the helm chart may be obtained. The helm chart may be obtained by (i) receiving the helm chart from an authorized user and/or an administrator, (ii) generating the helm chart by the authorized user and/or the administrator, (iii) selecting the helm chart from a repository of helm charts, etc. From helm chart selection process 200, helm chart 202 may be selected. Helm chart 202 may be selected based on (i) deployment and software application requirements, (ii) maintenance of configuration settings, (iii) adherence to security practices, (iv) efficient utilization of computing resources, (v) performance benchmarks meeting at least minimum requirements, etc.

Helm chart 202 may include sensitive data. Helm chart 202 may be ingested by helm chart analysis process 204. During helm chart analysis process 204, the sensitive data may be parsed and validated. To parse the sensitive data, lines of helm chart 202 may be read. For a line of the lines of helm chart 202, a keyword search may be performed. The keyword search may entail searching for keys that include "password," "port," "ip_address," "maintainer," "repository," etc. Once a key is found, the key and a value of the key may be validated.

Validation of the value may include ensuring that (i) a format of the value is in a readable format, (ii) syntax requirements for the value are met, (iii) content of the value is correct, (iv) a type and the content of the value meet regulatory standards, and (v) the content of the value has not been altered.

For example, suppose a line of the lines in helm chart 202 was read. Further, suppose that the line may include a key that indicated a repository URL for proprietary software and the value may include a repository URL string. Validation of the URL string may ensure that (i) the repository URL is a valid address, (ii) characters of the repository URL are in the correct format, (iii) the repository URL is a working address to a repository, (iv) the repository URL is accessible, which may require further sensitive data such as a password and/or a port, and (v) the repository URL is correctly written. Further, (v) may include further validation if the repository URL is encrypted.

Also during helm chart analysis process 204, configuration settings and the sensitive data may be qualified to validate use of a helm chart 202 with a deployment. The configuration settings and the sensitive data may be qualified by performing a debugging process with at least one edge device and at least one container image. The container image may be generated in the debugging process. The at least one edge device may be selected in the debugging process too. Output of the debugging process may be read during helm chart analysis process 204 to validate use of helm chart 202 with a deployment.

During helm chart analysis process 204, the sensitive data may be written in helm chart proposed sensitive data 206. Helm chart proposed sensitive data 206 may include keys and values of sensitive data from helm chart 202. In place of the sensitive data in helm chart 202, placeholders may be inserted in place of the values while the keys of the sensitive data may remain. A placeholder of the placeholders may include a secret identification string and/or code that points to the sensitive data. Helm chart proposed prototype 210 may be generated by adding the placeholders in helm chart 202. The placeholders may be present to allow for insertion of sensitive data. However, before the insertion of sensitive data can be performed, helm chart proposed prototype 210 may be approved by an administrator. Likewise, helm chart proposed sensitive data 206 may also be approved by an administrator before being secured.

To approve helm chart proposed prototype 210 and helm chart proposed sensitive data 206, administrator review process 208 may be performed. During administrator review process 208, an administrator may review helm chart proposed prototype 210 and helm chart proposed sensitive data 206. The administrator may review helm chart proposed prototype 210 by ensuring that (i) the format of helm chart proposed prototype 210 is correct and readable by a deployment, (ii) content of helm chart proposed prototype 210 lacks sensitive data, and/or (iii) the placeholders for sensitive data are inserted correctly in place of sensitive data. Also, an administrator may review helm chart proposed sensitive data 206. The review of helm chart proposed sensitive data 206 may include (i) ensuring helm chart proposed sensitive data 206 qualifies as sensitive data and (ii) reviewing validation of the sensitive data, which can include repeating at least one step of validation steps in helm chart analysis process 204.

Once administrator review process 208 is complete and helm chart proposed prototype 210 and helm chart proposed sensitive data 206 pass review requirements, then administrator authorization 212 may be generated. Administrator authorization 212 may include a digital signature and/or a digital certificate on which the name and credentials of the administrator are written. Further, helm chart prototype 218 may be generated by recording administrator authorization 212 on helm chart proposed prototype 210. Similarly, helm chart sensitive data 214 may be generated by recording administrator authorization 212 on helm chart proposed sensitive data 206.

Using administrator authorization 212, helm chart sensitive data 214 may be stored in vault 216. Vault 216 may store sensitive data that underwent parsing and validation in helm chart analysis process 204 and review in administrator review process 208. Vault 216 may be a secure vault that may require administrator authorization 212 for access. Also, vault 216 may be located on any number of edge device 100B-100N from FIG. 1.

Additionally, helm chart prototype 218 may be stored in helm chart prototype repository 220. Helm chart prototype repository 220 may store helm chart prototypes generated in helm chart analysis process 204 and reviewed in administrator review process 208. A helm chart prototype in helm chart prototype repository 220 may require administrator authorization 212 before being stored.

Thus, via the data flow illustrated in FIG. 2A, a system in accordance with an embodiment may store sensitive data in a secure vault and generate a helm chart prototype. Consequently, a deployment (e.g., 100) may be more likely to be able to provide desired computer implemented services by securing (i) the sensitive data from the helm chart and (ii) the helm chart prototype that was generated from the helm chart.

Turning to FIG. 2B, a second data flow diagram in accordance with an embodiment is shown. The second data flow diagram may illustrate data used in and data processing performed in performing computer implemented services using sensitive data and a helm chart prototype.

To perform the computer implemented services, request 222 may be made. Request 222 may be made by (i) determining the computer implemented services that are needed, such as data storage, database management, system monitoring, etc., (ii) defining the objectives, performance requirements, and expected outcomes of the computer implemented services, (iii) obtaining approval for the computer implemented services from an administrator, and (iv) submitting request 222 to a device management system, such as edge orchestrator 100A in FIG. 1.

Request 222 may be ingested by deployment management process 223. During deployment management process 223, resources may be obtained to perform the computer implemented services. The resources may include (i) assigning any number of edge devices with which to perform the computer implemented services, such as edge device 100B-100N from FIG. 1, (ii) selecting an artifact of artifacts 232, (iii) selecting helm chart prototype repository 220 to select helm chart prototype 218, and (iv) accessing vault 216 to select helm chart sensitive data 214.

The artifact of artifacts 232 may include executable code, libraries, and/or container applications. Helm chart prototype 218 may include configuration settings by which the computer implemented services may be performed. The configuration settings may include resource configurations (central processing unit limits, memory usage limits, etc.), environment variables, volume mount variables, ingress configurations, etc. Also included in the configuration settings may be helm chart sensitive data 214, which may include, for example, passwords, ports, repository URL for proprietary software, names and credentials for administrators, etc. Helm chart sensitive data 214 may include sensitive data that was not extracted from helm chart 202 in the description of FIG. 2A.

To include helm chart sensitive data 214 in helm chart prototype 218, helm chart data infusion process 225 may be performed. During helm chart data infusion process 225, helm chart sensitive data 214 may be inserted into placeholders for sensitive data in helm chart prototype 218. Helm chart sensitive data 214 may be inserted by linking to helm chart sensitive data 214 using the secret identification string and/or code in a placeholder of the placeholders. Helm chart sensitive data 214 may be inserted by replacing a placeholder for a key in helm chart prototype 218 with a value from helm chart sensitive data 214.

As a result of replacing placeholders in helm chart prototype 218 with values from helm chart sensitive data 214, sensitive data infused helm chart 224 may be generated. Sensitive data infused helm chart 224 may include sensitive data within the configuration settings.

Sensitive data infused helm chart 224 and artifacts 232 may be ingested by automation framework process 226. During automation framework process 226, deployment and management of artifacts 232 may be performed. The deployment may take place by (i) reading the configuration settings in sensitive data infused helm chart 224, (ii) accessing software and dependencies using the configuration settings, (iii) performing a build of the software to obtain an software image, and (iv) adding the software image to a container of artifacts 232 to obtain container image 228.

For example, sensitive data in sensitive data infused helm chart 224 may include repository URLs for software requiring maintainer credentials and password. During automation framework process 226, the configuration settings, including the sensitive data in sensitive data infused helm chart 224, may be read. The sensitive data may be needed to access a repository with the software. Further, the maintainer credentials and password may be needed to download source code to perform a build of the software to obtain a software image.

Container image 228 may encapsulate the software image and dependencies. Container image 228 may be ingested by service execution process 230. During service execution process 230, container image 228 may be assigned to an edge device in a deployment. After assignment of container image 228 to an edge device, container image 228 may be deployed to the edge device and software on container image 228 may be executed. By executing container image 228, computer implemented services may be performed by the deployment.

Thus, via the data flow illustrated in FIG. 2B, a system in accordance with an embodiment may perform computer implemented services using sensitive data and a helm chart prototype. Consequently, a deployment (e.g., 100) may be more likely to be able to provide desired computer implemented services by (i) generating a helm chart by adding the sensitive data to the helm chart prototype and (ii) performing computer implemented services by utilizing configuration settings from the helm chart.

Turning to FIG. 2C, a first diagram illustrating content of a data structure in accordance with an embodiment is shown. The first diagram may illustrate a helm chart and a values chart with dependencies of the helm chart.

A chart in the top half of FIG. 2C may be the helm chart written in a markup language. The components of the helm chart may include keys with labels such as "name," "dependencies," "maintainers," etc. The values to the keys may be written to the right of the keys in the helm chart. In FIG. 2C, the values are written with placeholders surrounded by curly brackets. The placeholders may include secret identification strings and/or codes embedded within a value that points to sensitive data.

The keys above the dependencies key may include metadata keys for the helm chart. For example, (i) a name key may include a value for a name for the helm chart, (ii) a version key may include the value for a semantic versioning number for the helm chart, (iii) a Kubernetes version may include the value for a version of a Kubernetes orchestration system used to deploy and manage containers, (iv) a description key may include the value for a string description for the helm chart, and (v) a home key may include the value of a URL for a repository or website where the helm chart is stored.

Below the metadata keys, sections with labels "dependencies" and "maintainers" may be included in the helm chart. For each dependency, a name key, a version key, and a repository key may be included. The name key may include the value for a name for the dependency, the version key may include the value for a version of the dependency, and the repository key may include the value for a URL where source code for the dependency is stored. For each maintainer, a name key and an e-mail key may be included. The name key may include the value for a name of the maintainer and the email key may include the value for the e-mail of the maintainer.

Values under the dependency and maintainer sections may include sensitive data. The dependency section may, for example, include names, versions, and/or a repository URL for proprietary software that is used by the helm chart. Further, the maintainer section may, for example, include credentials of maintainers that update and maintain the helm chart and/or dependencies of the helm chart.

A chart in the bottom half of FIG. 2C may be second values for components of the helm chart also written in a markup language. The second values may include a key with a label "title." The title key may include a value for the title of the second values. The second values may include two sections for two dependencies: "depName1" and "depName2." The two sections may hold data for the two dependencies.

For a first dependency, "depName1," data for the first dependency may include keys labeled "max connections" and "password." The max connections key may include a maximum number of allowable client connections for a database. The password key may include a value that may be sensitive data because the value is a password to access the first dependency.

For a second dependency, "depName2," data for the third dependency may include a key labeled "password." The password key may include a value that may be sensitive data because the value is a password to access the first dependency.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
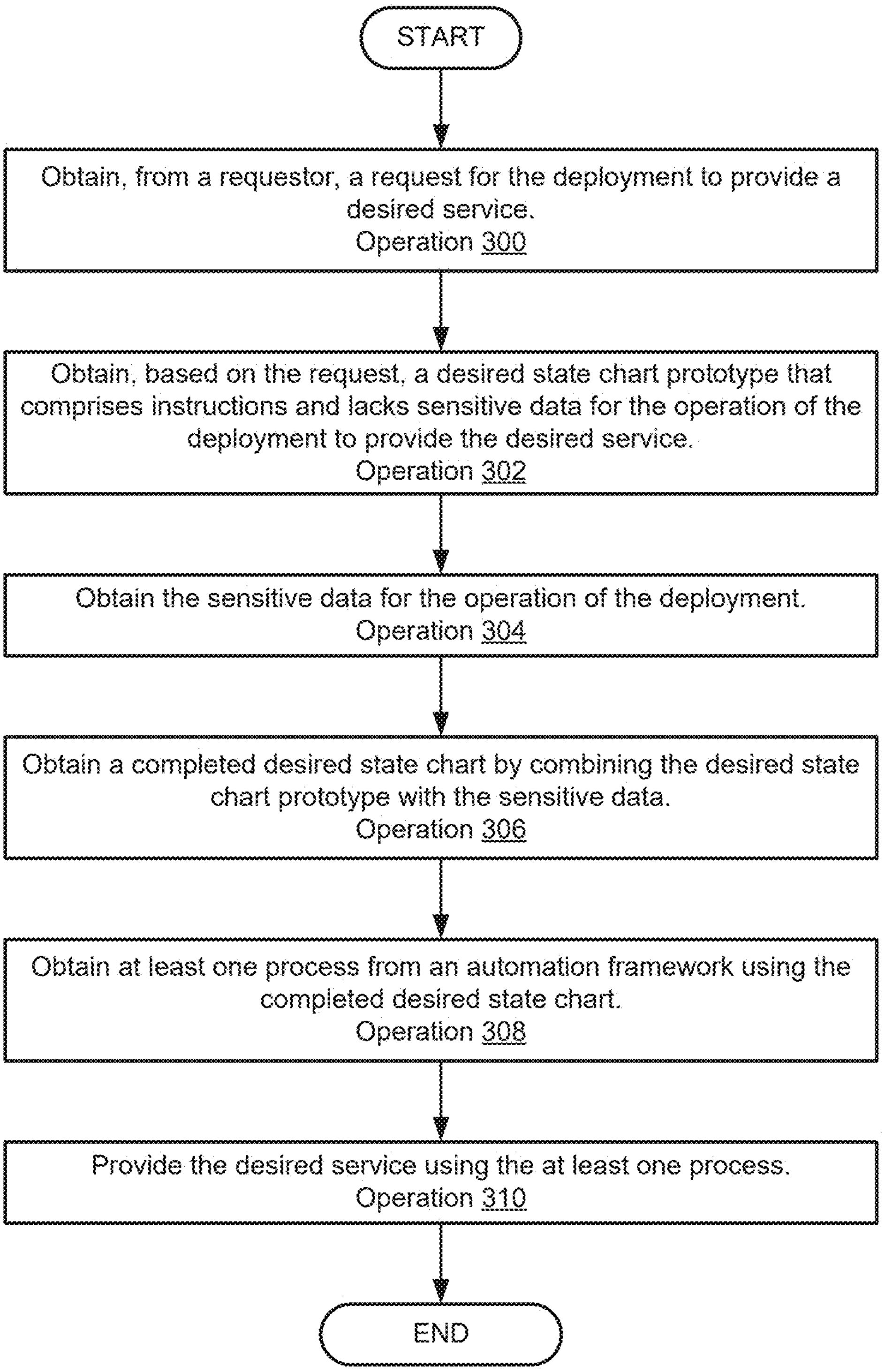
FIGS. 3A-3B show flow diagrams illustrating a method in accordance with an embodiment.
Figure 3B:
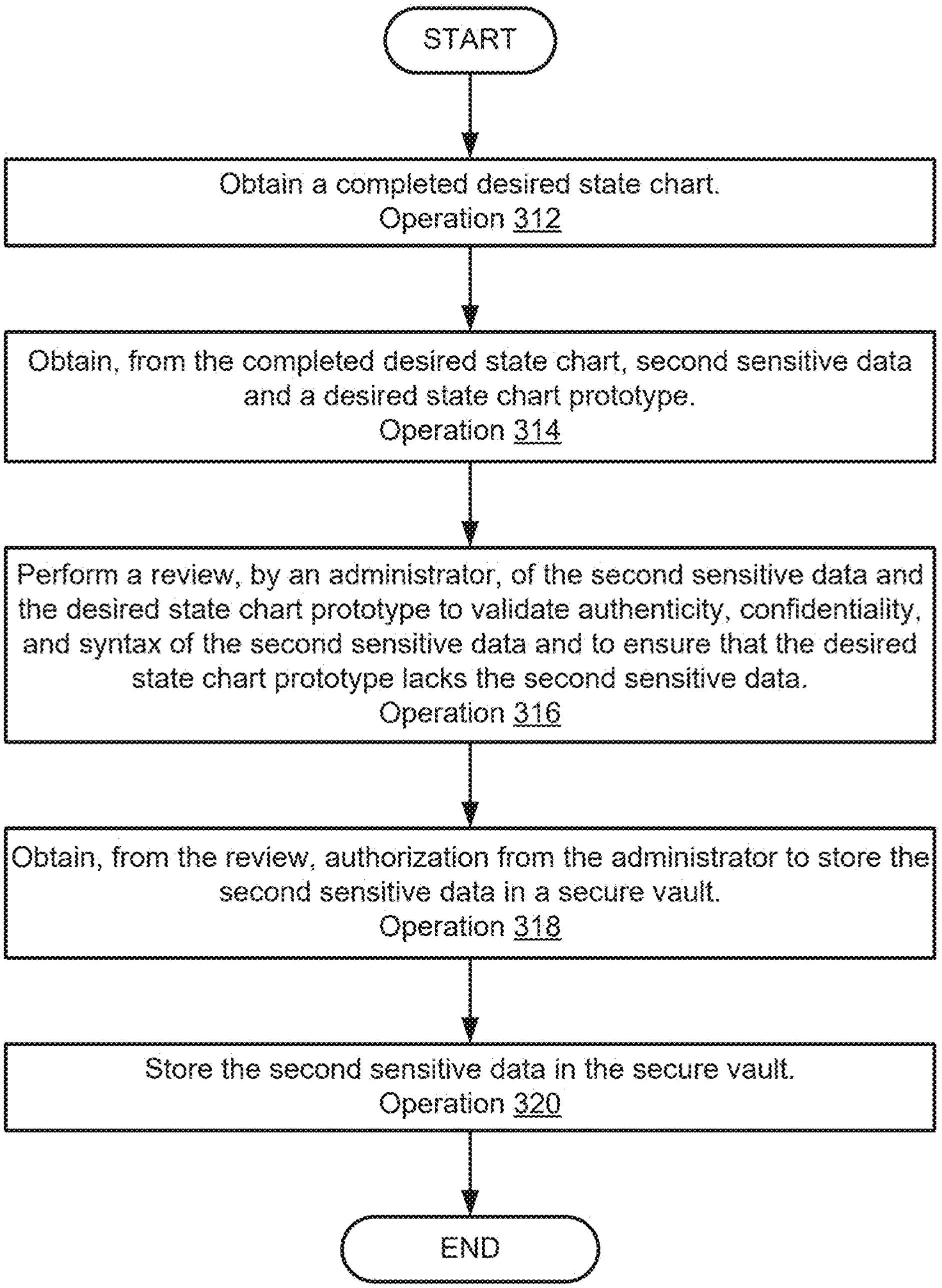

As discussed above, the components of FIG. 1 may perform various methods to managing operation of a deployment. FIGS. 3A-3B illustrate a method that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing operation of a deployment in accordance with an embodiment is shown. The method may be performed, for example, by any of the components of the system of FIG. 1, and/or other components not shown therein.

At operation 300, a request may be obtained from a requestor for the deployment to provide a desired service. The request may be obtained by receiving the request from the requestor.

At operation 302, a desired state chart prototype may be obtained that, based on the request, includes instructions, and lacks sensitive data for the operation of the deployment to provide the desired service. Refer to FIG. 3B for details on how the desired state chart prototype may be obtained prototype may be obtained.

At operation 304, the sensitive data may be obtained for the operation of the deployment. The sensitive data may be obtained by reading the sensitive data from the secure vault. The sensitive data may be read by performing a keyword search for types of the sensitive data, such as passwords, ports, repository URLs, etc., and reading the values from the keyword search.

At operation 306, a completed desired state chart may be obtained by combining the desired state chart prototype with the sensitive data. The completed desired state chart may be obtained by replacing a field in the desired state chart prototype with a corresponding portion of the sensitive data. The field in the desire state chart may be replaced by inserting the corresponding portion of the sensitive data in the field in the desire state chart.

At operation 308, at least one process may be obtained from an automation framework using the completed desired state chart. The at least one process may be obtained by using configuration settings from the completed desired state chart to build software that can be run on an artifact such as a container.

At operation 310, a desired service may be provided using the at least one process. The desired service may be provided by running the software on the artifact and assigning the artifact to an edge device in the deployment.

The method may end following operation 310.

Turning to FIG. 3B, at operation 312, a completed desired state chart may be obtained. The completed desired state chart may be obtained by (i) receiving the completed desired state chart, (ii) generating the completed desired state chart, and/or (iii) obtaining the completed desired state chart from a repository of completed desired state charts.

At operation 314, second sensitive data and a desired state chart prototype may be obtained from the completed desired state chart. The second sensitive data may or may not be similar to the sensitive data in the description of FIG. 3A. The second sensitive data and a desired state chart prototype may be obtained by performing a validation process on data within the completed desired state chart to identify the second sensitive data and ensure that the second sensitive data meets a set of standards. The validation data may be performed by (i) identifying the second sensitive data in the completed desired state chart by performing a keyword search in each section of the completed desired state chart; and (ii) ensuring the second sensitive data meets the set of the standards, the set of the standards comprising correct character formatting, a readable format, compliance with data privacy regulations, and being in an original state in which the second sensitive data has not been altered by unauthorized users.

The second sensitive data may be identified by performing a keyword search for types of the second sensitive data, such as passwords, ports, repository URLs, etc., and reading the values from the keyword search. The second sensitive data may be ensured to meet the set of the standards by performing an analysis on the sensitive data, the analysis qualifying the second sensitive data so that all standards of the set of the standards are met.

At operation 316, a review may be performed by an administrator of the second sensitive data and the desired state chart prototype to validate authenticity, confidentiality, and syntax of the second sensitive data and to ensure that the desired state chart prototype lacks the second sensitive data. The review may be performed by verifying, by the administrator, results of the validation process. The results may be expected to confirm qualification of the second sensitive data meeting all the standards of the set of the standards.

At operation 318, authorization from an administrator may be obtained from the review to store the second sensitive data in a secure vault. The authorization may be obtained by confirming, by the administrator, that the second sensitive data meets all the standards of the set of the standards.

At operation 320, the second sensitive data may be stored in a secure vault. The second sensitive data may be stored by writing the second sensitive data to an edge device in which the secure vault is located. Authorization from the administrator may be required to write the second sensitive data to the secure vault and read the second sensitive data from the secure vault.

Thus, via the method shown in FIG. 3B, embodiments herein may likely improve a likelihood of managing operation of the deployment. By improving the likelihood of managing operation of the deployment, the data processing systems may be more likely to provide desirable computer implemented services by, for example, securing sensitive data from a completed desired state chart, generating a complete desired state chart with sensitive data from a desired state chart prototype when a request for computer implemented services is made, etc.

Figure 4:
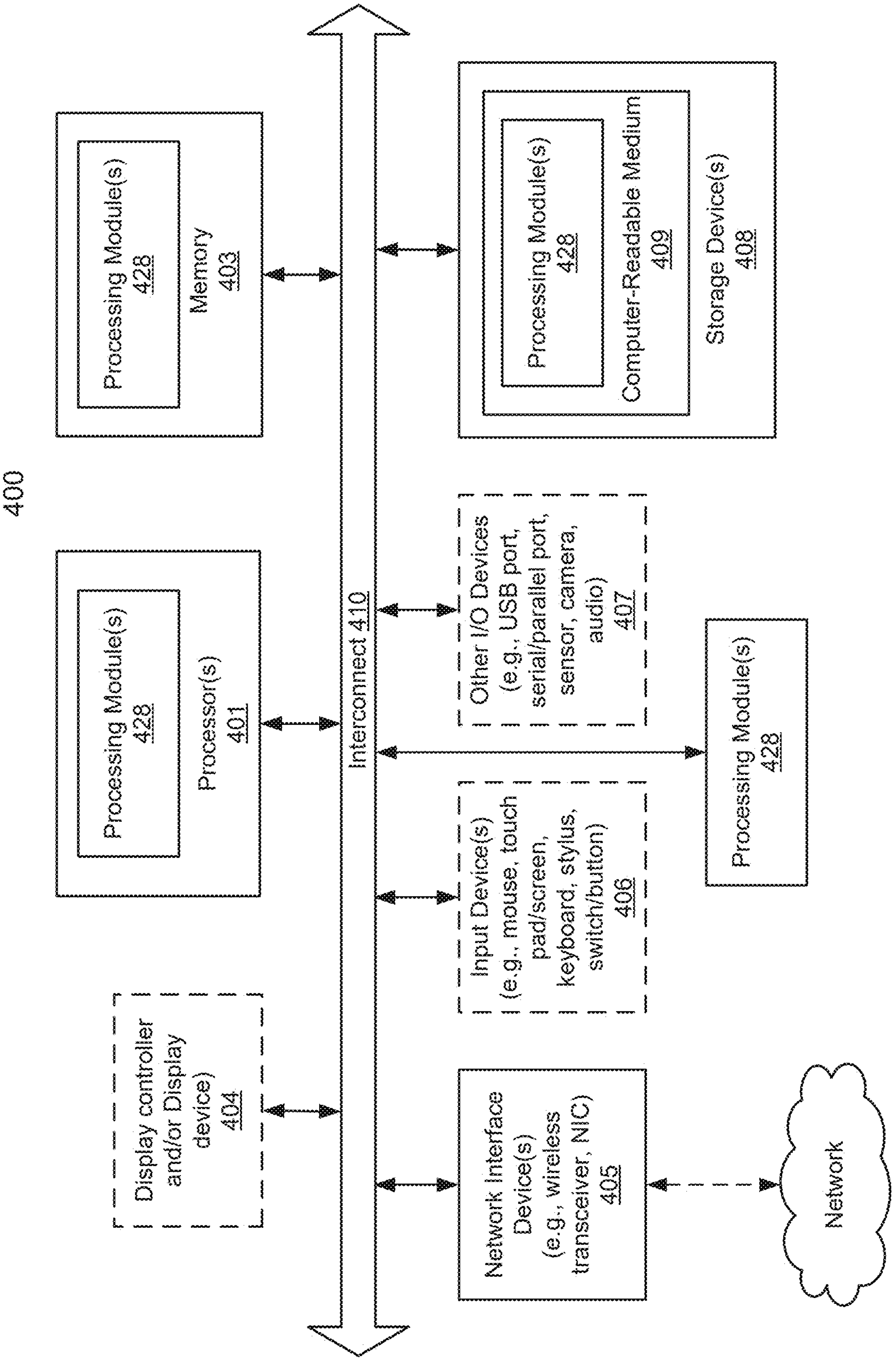
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown.

For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows®p9 operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment, the method comprising:

obtaining a previously completed desired state chart;

obtaining a desired state chart prototype by identifying second sensitive data in the previously completed desired state chart and replacing a portion of the second sensitive data with one or more placeholders;

performing a review, by an administrator, of the second sensitive data and the desired state chart prototype to:

validate authenticity, confidentiality, and syntax of the second sensitive data; and ensure that the desired state chart prototype comprises instructions to provide a desired service and lacks the portion of the second sensitive data;

storing the desired state chart prototype in a repository;

obtaining, from a requestor, a request for the deployment to provide the desired service;

based on the request:

obtaining the desired state chart prototype that comprises the instructions and lacks the portion of the second sensitive data for the operation of the deployment to provide the desired service;

obtaining first sensitive data for the operation of the deployment;

obtaining a completed desired state chart by combining the desired state chart prototype with the first sensitive data;

obtaining at least one process from an automation framework using the completed desired state chart; and providing the desired service using the at least one process.

2. The method of claim 1, further comprising:

before obtaining the request:

obtaining, from the review, authorization from the administrator to store the second sensitive data in a secure vault; and storing the second sensitive data in the secure vault.

3. The method of claim 2, wherein obtaining the desired state chart prototype comprises:

performing a validation process on data within the completed desired state chart to identify the second sensitive data and ensure that the second sensitive data meets a set of standards.

4. The method of claim 3, wherein performing the validation process comprises:

identifying the second sensitive data in the completed desired state chart by performing a keyword search in each section of the completed desired state chart; and ensuring the second sensitive data meets the set of the standards, the set of the standards comprising correct character formatting, a readable format, compliance with data privacy regulations, and being in an original state in which the second sensitive data has not been altered by unauthorized users, wherein ensuring the second sensitive data meets the set of standards ensures the desired state chart prototype is readable by the deployment after being combined with other sensitive data that meets the set of standards.

5. The method of claim 1, wherein obtaining the first sensitive data comprises:

reading the first sensitive data from a secure vault.

6. The method of claim 5, wherein the secure vault stores the first sensitive data, is located on a device of the deployment, and requires authorization from the administrator to access the first sensitive data.

7. The method of claim 1, wherein obtaining the completed desired state chart by combining the desired state chart prototype with the first sensitive data comprises:

replacing a field in the desired state chart prototype with a corresponding portion of the first sensitive data.

8. The method of claim 1, wherein the second sensitive data comprises a key and a value associated with the key, the value being the portion of the second sensitive data replaced with the one or more placeholders to obtain the desired state chart prototype.

9. The method of claim 8, wherein the key of the second sensitive data remains in the desired state chart prototype and indicates a repository URL for proprietary software, wherein the value of the second sensitive data comprises a repository URL string that is replaced by the one or more placeholders in the desired state chart prototype, and wherein the first sensitive data is a replacement value that replaces the one or more placeholders when combining the desired state chart prototype with the first sensitive data.

10. A non-transitory machine-readable medium having instructions stored therein, which when executed by a processor, cause the processor to perform operations for managing operation of a deployment, the operations comprising:

obtaining a previously completed desired state chart;

obtaining a desired state chart prototype by identifying second sensitive data in the previously completed desired state chart and replacing a portion of the second sensitive data with one or more placeholders;

performing a review, by an administrator, of the second sensitive data and the desired state chart prototype to:

validate authenticity, confidentiality, and syntax of the second sensitive data; and ensure that the desired state chart prototype comprises instructions to provide a desired service and lacks the portion of the second sensitive data;

storing the desired state chart prototype in a repository;

obtaining, from a requestor, a request for the deployment to provide the desired service;

based on the request:

obtaining the desired state chart prototype that comprises the instructions and lacks the portion of the second sensitive data for the operation of the deployment to provide the desired service;

obtaining first sensitive data for the operation of the deployment;

obtaining a completed desired state chart by combining the desired state chart prototype with the first sensitive data;

obtaining at least one process from an automation framework using the completed desired state chart; and providing the desired service using the at least one process.

11. The non-transitory machine-readable medium of claim 10, wherein the operations further comprise:

before obtaining the request:

obtaining, from the review, authorization from the administrator to store the second sensitive data in a secure vault; and storing the second sensitive data in the secure vault.

12. The non-transitory machine-readable medium of claim 11, wherein obtaining the desired state chart prototype comprises:

performing a validation process on data within the completed desired state chart to identify the second sensitive data and ensure that the second sensitive data meets a set of standards.

13. The non-transitory machine-readable medium of claim 12, wherein performing the validation process comprises:

identifying the second sensitive data in the completed desired state chart by performing a keyword search in each section of the completed desired state chart; and ensuring the second sensitive data meets the set of the standards, the set of the standards comprising correct character formatting, a readable format, compliance with data privacy regulations, and being in an original state in which the second sensitive data has not been altered by unauthorized users, wherein ensuring the second sensitive data meets the set of standards ensures the desired state chart prototype is readable by the deployment after being combined with other sensitive data that meets the set of standards.

14. The non-transitory machine-readable medium of claim 10, wherein obtaining the first sensitive data comprises:

reading the first sensitive data from a secure vault.

15. The non-transitory machine-readable medium of claim 14, wherein the secure vault stores the first sensitive data, is located on a device of the deployment, and requires authorization from the administrator to access the first sensitive data.

16. A data processing system, comprising:

a processor; and a memory coupled to the processor to store instructions, which when executed by the processor, cause the processor to perform operations for managing operation of a deployment, the operations comprising:

obtaining a previously completed desired state chart;

obtaining a desired state chart prototype by identifying second sensitive data in the previously completed desired state chart and replacing a portion of the second sensitive data with one or more placeholders;

performing a review, by an administrator, of the second sensitive data and the desired state chart prototype to:

validate authenticity, confidentiality, and syntax of the second sensitive data; and ensure that the desired state chart prototype comprises instructions to provide a desired service and lacks the portion of the second sensitive data;

storing the desired state chart prototype in a repository;

obtaining, from a requestor, a request for the deployment to provide the desired service;

based on the request:

obtaining the desired state chart prototype that comprises the instructions and lacks the portion of the second sensitive data for the operation of the deployment to provide the desired service;

obtaining first sensitive data for the operation of the deployment;

obtaining a completed desired state chart by combining the desired state chart prototype with the first sensitive data;

obtaining at least one process from an automation framework using the completed desired state chart; and providing the desired service using the at least one process.

17. The data processing system of claim 16, wherein the operations further comprise:

before obtaining the request:

obtaining, from the review, authorization from the administrator to store the second sensitive data in a secure vault; and storing the second sensitive data in the secure vault and storing the desired state chart prototype in the repository.

18. The data processing system of claim 17, wherein obtaining the desired state chart prototype comprises:

performing a validation process on data within the completed desired state chart to identify the second sensitive data and ensure that the second sensitive data meets a set of standards.

19. The data processing system of claim 18, wherein performing the validation process comprises:

identifying the second sensitive data in the completed desired state chart by performing a keyword search in each section of the completed desired state chart; and ensuring the second sensitive data meets the set of the standards, the set of the standards comprising correct character formatting, a readable format, compliance with data privacy regulations, and being in an original state in which the second sensitive data has not been altered by unauthorized users, wherein ensuring the second sensitive data meets the set of standards ensures the desired state chart prototype is readable by the deployment after being combined with other sensitive data that meets the set of standards.

20. The data processing system of claim 16, wherein obtaining the first sensitive data comprises:

reading the first sensitive data from a secure vault.

* * * * *